(12) United States Patent
Klaehn et al.

(10) Patent No.: US 8,129,498 B2
(45) Date of Patent: *Mar. 6, 2012

(54) POLYMERIC MEDIUM

(75) Inventors: John R. Klaehn, Idaho Falls, ID (US); Eric S. Peterson, Idaho Falls, ID (US); Christopher J. Orme, Shelley, ID (US); Michael G. Jones, Chubbuck, ID (US); Alan K. Wertsching, Idaho Falls, ID (US); Thomas A. Luther, Idaho Falls, ID (US); Tammy L. Trowbridge, Idaho Falls, ID (US)

(73) Assignee: Battelle Energy Alliance, LLC, Idaho Falls, ID (US)

( * ) Notice: Subject to any disclaimer, the term of this patent is extended or adjusted under 35 U.S.C. 154(b) by 1160 days.

This patent is subject to a terminal disclaimer.

(21) Appl. No.: 11/933,652

(22) Filed: Nov. 1, 2007

(65) Prior Publication Data
US 2011/0263727 A1    Oct. 27, 2011

Related U.S. Application Data

(62) Division of application No. 10/969,456, filed on Oct. 19, 2004, now Pat. No. 7,309,758.

(51) Int. Cl.
*C08G 73/18* (2006.01)
*C08G 73/00* (2006.01)

(52) U.S. Cl. ........ 528/423; 528/220; 528/228; 528/398; 528/482; 528/485; 528/487; 528/488; 528/503; 525/540

(58) Field of Classification Search .................. 528/423, 528/220, 228, 398, 482, 485, 487, 488, 503; 525/540
See application file for complete search history.

(56) References Cited

U.S. PATENT DOCUMENTS

| RE26,065 E | 7/1966 | Marvel |
| 3,408,366 A | 10/1968 | White |
| 3,518,234 A | 6/1970 | Hara et al. |
| 3,549,603 A | 12/1970 | Chenevey et al. |

(Continued)

FOREIGN PATENT DOCUMENTS

WO    WO 2006/118353    11/2006

OTHER PUBLICATIONS

Claims 1-15 of U.S. Appl. No. 11/933,604.*

(Continued)

*Primary Examiner* — Duc Truong
(74) *Attorney, Agent, or Firm* — Wells St. John

(57) ABSTRACT

A PBI compound includes imidazole nitrogens at least a portion of which are substituted with a moiety containing a carbonyl group, the substituted imidazole nitrogens being bonded to carbon of the carbonyl group. At least 85% of the nitrogens may be substituted. The carbonyl-containing moiety may include RCO—, where R is alkoxy or haloalkyl. The PBI compound may exhibit a first temperature marking an onset of weight loss corresponding to reversion of the substituted PBI that is less than a second temperature marking an onset of decomposition of an otherwise identical PBI compound without the substituted moiety. The PBI compound may be included in separatory media. A substituted PBI synthesis method may include providing a parent PBI in a less than 5 wt % solvent solution. Substituting may use more than 5 equivalents in relation to the imidazole nitrogens to be substituted.

21 Claims, 10 Drawing Sheets

U.S. PATENT DOCUMENTS

| | | | |
|---|---|---|---|
| 3,578,644 | A | 5/1971 | Trischler |
| 3,708,439 | A | 1/1973 | Sayigh et al. |
| 3,943,125 | A | 3/1976 | Gerber |
| 4,020,142 | A | 4/1977 | Davis et al. |
| 4,154,919 | A | 5/1979 | Sheratte |
| 4,312,976 | A | 1/1982 | Choe |
| 4,483,977 | A | 11/1984 | Conciatori et al. |
| 4,530,922 | A | 7/1985 | Moberg |
| 4,599,388 | A | 7/1986 | Bower et al. |
| 4,693,824 | A | 9/1987 | Sansone |
| 4,693,825 | A | 9/1987 | Trouw |
| 4,759,986 | A | 7/1988 | Marikar et al. |
| 4,771,117 | A | 9/1988 | Citron et al. |
| 4,814,399 | A | 3/1989 | Sansone et al. |
| 4,814,400 | A | 3/1989 | Sansone |
| 4,868,249 | A | 9/1989 | Sansone |
| 4,898,917 | A | 2/1990 | Sansone |
| 4,933,397 | A | 6/1990 | Sansone et al. |
| 4,997,892 | A | 3/1991 | Sansone et al. |
| 5,017,420 | A | 5/1991 | Marikar et al. |
| 5,290,884 | A | 3/1994 | Calundann et al. |
| 5,389,326 | A | 2/1995 | Kasowski et al. |
| 5,599,639 | A | 2/1997 | Sansone et al. |
| 5,945,233 | A | 8/1999 | Onorato et al. |
| 6,124,060 | A | 9/2000 | Akita et al. |
| 6,323,301 | B1 | 11/2001 | Smith et al. |
| 6,997,971 | B1 | 2/2006 | Young et al. |
| 7,235,320 | B2 | 6/2007 | Calundann et al. |
| 2009/0018277 | A1 | 1/2009 | Okamoto et al. |

OTHER PUBLICATIONS

Trischler et al., "Substituted Aliphatic Polybenzimidazoles as Membrane Separator Materials," Journal of Applied Polymer Science, vol. 13, pp. 101-106 (1969).

Roziere, Jacques and Jones, Deborah, *Non-Fluorinated Polymer Materials for Proton Exchange Membrane Fuel Cells*, Annu. Rev. Mater. Res. 2003, vol. 33, pp. 503-555.

Burns, Ryan and Koros, William, *Structure—Property Relationships for Poly(pyrrolone-imide) Gas Separation Membranes*, Macromolecules 2003, 36, pp. 2374-2381.

Schuster, Martin F.H. and Meyer, Wolfgang, *Anhydrous Proton-Conducting Polymers*, Annu. Rev. Mater. Res, 2003, vol. 33, pp. 233-261.

Haile, Sossina M., *Fuel Cell Materials and Components*, Science Direct, Acta Materialia 51, 2003, pp. 5981-6000.

Wijmans, J.G. and Baker R.W., *The Solution-Diffusion Model: A Review*, Journal of Membrane Science 107, 1995, pp. 1-21.

Jones, Deborah and Roziere, Jacques, *Recent Advances in the Functionalisation of Polybenzimidazole and Polyetherketone for Fuel Cell Applications*, Journal of Membrane Science 185, 2001, pp. 41-58.

Barrer, R.M., Tras. Faraday Soc. 1939, vol. 35, p. 628.

Rogers, C., et al, *Studies in the Gas and Vapor Permeability of Plastic Films and Coated Papers, Parts I and II*, TAPPI 1956, vol. 39, p. 737.

Vogel, Herward and Marvel, C.S., *Polybenzimidazoles, New Thermally Stable Polymers*, Journal of Polymer Science, vol. L, 1961, pp. 511-539.

Gieselman, Melinda and Reynolds, John, *Aramid and Imidazole Based Polyelectrolytes: Physical Properties and Ternary Phase Behavior with Poly(Benzobisthiazole) in Methanesulfonic Acid*, Macromolecules, 1993, vol. 26, pp. 5633-5642.

Gieselman, Melinda and Reynolds, John, *Water-Soluable Polybenzimidazole-Based Polyelectrolytes*, Macromolecules, 1992, vol. 25, pp. 4832-4834.

Van Amerongen, G.J., *Permeation, Diffusion and Solution of Gases in Organic-inorganic hybrid moiety Polymers*, J. App. Physics, 1946, vol. 17, p. 972.

M. Chanda and G. L. Rempel, *Polybenzimidazole resin-based new chelating agents. Uranyl and ferric ion selectivity of resins with anchored dimethylglyoxime*, Reactive Polymers, vol. 11, 1989, pp. 165-176.

M. Chanda and G. L. Rempel, *Polybenzimidazole resin based new chelating agents. Palladium(II) and platinum(IV) sorption on resin with immobilized dithiooxamide*, Reactive Polymers, vol. 12, Issue 1, Feb. 1990, pp. 83-94.

M. Chanda, G. L. Rempel, *Polybenzimidazole resin based new chelating agents uranyl ion selectivity of resins with immobilized glyoxal-bis-2-hydroxyanil and salicylaldehyde-ethylenediimine*, Reactive Polymers, vol. 13, Issues 1-2, Sep. 1990, pp. 103-119.

M. H. Kotze, B. R. Green and P. Ellis, *Fibrous weak-base anion exchangers from a polybenzimidazole staple for the extraction of gold cyanide*, Reactive Polymers, vol. 14, Issue 2, Mar. 1991, pp. 129-141.

M. Chanda and G. L. Rempel, *New chelating resins based on polybenzimidazole. Selective sorption of copper(II) from ammoniacal media on resin with anchored $_L$-cysteine*, Reactive Polymers, vol. 16, Issue 1, Dec. 1991, pp. 29-39.

M. Chanda and G. L. Rempel, *Removal of uranium from acidic sulfate solution by ion exchange on poly(4-vinylpyridine) and polybenzimidazole in protonated sulfate form*, Reactive Polymers, vol. 17, Issue 2, May 1992, pp. 159-174.

James D. White, Paul R. Blakemore, Selena Milicevic, Satish C. Choudhry, Joseph Cupano, and Lucia Serico, *Conversion of Carbamates to Amidosulfones and Amides. Synthesis of the [$^{14}C$]-Labeled Antiobesity Agent Ro23-7637*. Org. Lett., 2002, 4(10) pp. 1803-1806.

Hirokazu Sumiyoshi, Takafumi Shimizu, Miho Katoh, Yoshiyasu Baba, and Mikiko Sodeoka, *Solution-Phase Parallel Synthesis of Carbamates Using Polymer-Bound N-Hydroxysuccinimide*, Org. Lett.; 2002; 4(22) pp. 3923-3926.

Amanda R. Murphy, Jean M. J. Frechet, Paul Chang, Josephine Lee, and Vivek Subramanian, *Organic Thin Film Transistors from a Soluble Oligothiophene Derivative Containing Thermally Removable Solubilizing Groups* [*J. Am. Chem. Soc. 2004, 126, 1596-1597*]. J. Am. Chem. Soc.; 2004; 126(37) pp. 1750-11750.

Zhiyong Luo, John Williams, Roger W. Read, and Dennis P. Curran, *Fluorous Boc ($^F$Boc) Carbamates: New Amine Protecting Groups for Use in Fluorous Synthesis*, J. Org. Chem.; 2001; 66(12) pp. 4261-4266.

John D. Bass and Alexander Katz, *Thermolytic Synthesis of Imprinted Amines in Bulk Silica*, Chem. Mater.; 2003; 15(14) pp. 2757-2763.

David Mecerreyes, Hans Grande, Oscar Miguel, Estibalitz Ochoteco, Rebeca Marcilla, and Igor Cantero, *Porous Polybenzimidazole Membranes Doped with Phosphoric Acid: Highly Proton-Conducting Solid Electrolytes*, Chem. Mater.; 2004; 16(4) pp. 604-607.

Wainright, J.S., Wang, J-T., Weng, D., Savinell, R.F., and M.H. Litt, "*Acid-Doped Polybenzimidazoles, A New Polymer Electrolyte*," J. Electrochem. Soc., 142, L121-L123 (1995).

B. Xing and O. Savadogo, J. New. Mat. Electrochem. Systems 2, 95 (1999).

* cited by examiner

FIG. 5   $^1H$ NMR spectrum of $CH_3CH_2OCO-(PBI)(2)$ in $CDCl_3$.

POLYMERIC MEDIUM

RELATED APPLICATIONS

This application is a divisional of U.S. patent application Ser. No. 10/969,456 filed Oct. 19, 2004 now U.S. Pat. No. 7,309,758 and entitled "POLYBENZIMIDAZOLE COMPOUNDS, POLYMERIC MEDIA, AND METHODS OF POST-POLYMERIZATION MODIFICATIONS" which is a continuation-in-part of U.S. Pat. No. 7,259,230, issued Aug. 21, 2007, and entitled "Polybenzimidazole Compounds, Polymeric Media, And Methods Of Post-Polymerization Modifications," the entire subject matter of which is incorporated herein by reference.

GOVERNMENT RIGHTS

The United States Government has certain rights in this invention pursuant to Contract No. DE-AC07-99ID13727, and Contract No. DE-AC07-05ID14517 between the United States Department of Energy and Battelle Energy Alliance, LLC.

TECHNICAL FIELD

The invention pertains to polybenzimidazole compounds, polymeric media including polybenzimidazole compounds, and methods of making post-polymerization molecular modifications of polybenzimidazole.

BACKGROUND OF THE INVENTION

Polybenzimidazole (PBI) constitutes a well known class of heterocyclic polymers and is described, merely by way of example and not limitation, in U.S. Pat. No. 4,814,400 issued to Sansone. One PBI known as poly-2,2'(m-phenylene)-5,5'-bibenzimidazole has been used, as well as other PBI compounds, to form ionically conductive materials, fire resistant materials, and various types of separatory media, such as membranes and ultrafilters. Poly-2,2'(m-phenylene)-5,5'-bibenzimidazole is resistant to strong acids, bases, and high temperatures up to 500° C. but exhibits very poor solubility in common organic solvents. It is soluble under harsh conditions in highly polar, aprotic organic solvents, such as dimethyl sulfoxide (DMSO), N,N-dimethylacetamide (DMAc), N,N-dimethylformamide (DMF), and N-methylpyrrolidinone (NMP), which exhibit high boiling points and low vapor pressures. Accordingly, such solvents are not preferred for polymer processing.

As such, it would be advantageous to modify a PBI, such as poly-2,2'(m-phenylene)-5,5'-bibenzimidazole, to exhibit better solubility in common organic solvents more preferable for polymer processing. Also, an appropriate method for modifying PBI would be advantageous.

SUMMARY OF THE INVENTION

According to one aspect of the invention, a polybenzimidazole (PBI) compound includes imidazole nitrogens at least 85% of which are substituted with a moiety containing a carbonyl group. The substituted imidazole nitrogens are bonded to carbon of the carbonyl group. By way of example, the carbonyl-containing moiety may include RCO—, where R is organic and optionally contains an inorganic component. R may consist of alkoxy or haloalkyl. Substantially all of the imidazole nitrogens may be substituted with the RCO— moiety. The PBI compound may exhibit a first temperature marking an onset of weight loss corresponding to reversion of the substituted PBI, the first temperature being less than a second temperature marking an onset of decomposition of an otherwise identical PBI compound without the substituted moiety.

As an alternative, the PBI compound includes imidazole nitrogens at least a portion of which are substituted with a RCO— moiety, where R is organic and optionally contains an inorganic component. The substituted imidazole nitrogens are bonded to carbon of the RCO— moiety carbonyl group and R is bonded to the carbon of the carbonyl group by other than a C—O bond.

According to another aspect of the invention, a polymeric medium includes the PBI compounds described above.

According to a further aspect of the invention, a PBI synthesis method includes providing PBI having imidazole nitrogens, reacting the PBI with a compound containing a carbonyl group, and substituting at least 85% of the imidazole nitrogens with a moiety from the compound. The substituted imidazole nitrogens are bonded to carbon of the carbonyl group. By way of example, the PBI may be provided in a less than 5 wt % solution of the PBI in a solvent, such as about 2.5 wt %. The method may further include ionizing the imidazole nitrogens before the reacting. The ionizing may involve deprotonating with an alkali metal hydride. The ionizing, reacting, and/or substituting may occur at from about 20 to about 30° C. and/or at about atmospheric pressure. Reacting the PBI with a carbonyl-containing compound may use more than 5 equivalents of the compound in relation to the imidazole nitrogens to be substituted, such as about 10-15 equivalents. The compound may be RCOX, where R is organic, optionally containing an inorganic component, and X is a leaving group. R may consist of alkoxy or haloalkyl. X may include halogen, cyano, thiocyano, oxycyano, thioalkyl, alkoxy, fluoroalkoxy, sulfonylalkyl, oxyaromatic, thioaromatic, sulfonylaromatic, aromatic and alkyl carbodiimides, N-hydroxysuccinimide, oxyphosphorus containing compounds, or oxysilane containing compounds. For example, RCOX may include at least one of the following: $(CH_3)_2CHCH_2OCOCl$, $CH_3CH_2OCOCl$, and $BrCH_2(CH_2)_3COCl$.

As an alternative, a substituted PBI synthesis method includes providing PBI having imidazole nitrogens, reacting the PBI with a RCOX compound, where R is organic, optionally containing an inorganic component, and X is a leaving group, and substituting at least a portion of the imidazole nitrogens with a RCO— moiety from the compound. The substituted imidazole nitrogens are bonded to carbon of the RCO— moiety carbonyl group and R is bonded to the carbon of the carbonyl group by other than a C—O bond.

According to a still further aspect of the invention, a polymeric medium fabrication method includes forming a polymeric medium that includes the substituted PBI compounds described above.

BRIEF DESCRIPTION OF THE DRAWINGS

Preferred embodiments of the invention are described below with reference to the following accompanying drawings.

DETAILED DESCRIPTION OF THE PREFERRED EMBODIMENTS

Figure 1:
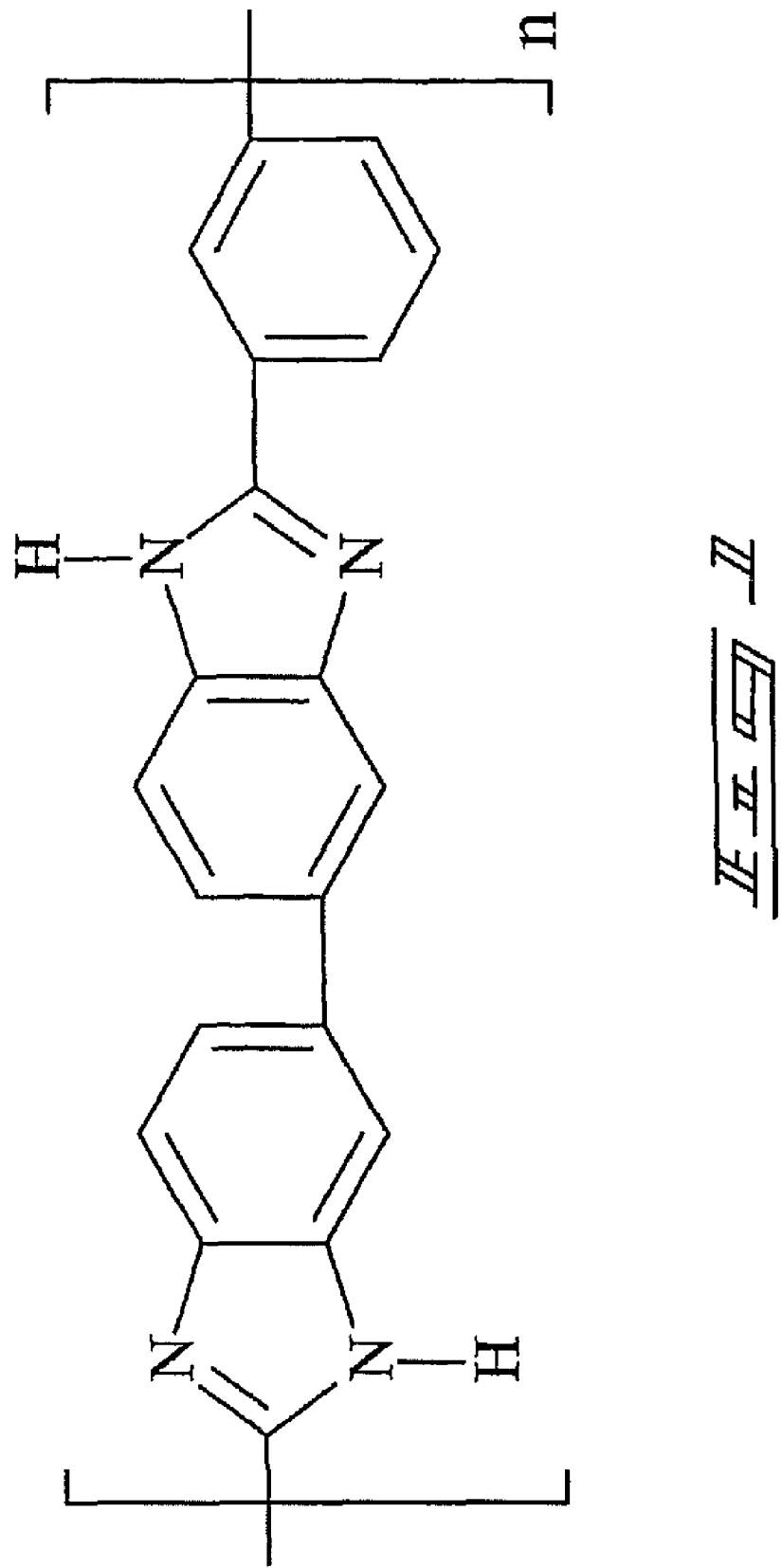
FIG. 1 shows the chemical structure of poly-2,2'(m-phenylene)-5,5'-bibenzimidazole.

PBI may be synthetically modified to produce a polymer soluble in a wider range of organic solvents, including those preferred for polymer processing. The synthetic modification can be accomplished by exploiting the reactive imidazole nitrogens of PBI with polymer substitution (grafting) or by altering monomers and subsequently forming the desired polymer. Since a variety of PBI compounds can be acquired commercially, substitution of the polymer is preferred. Altering monomers and subsequently forming the desired polymer can be difficult and the resulting polymer molecular morphology can be considerably different from the intended parent PBI. However, previous attempts to enhance PBI solubility in common solvents by substitution of PBI met with little success.

Some of the attempts at modifying PBI relying upon the reactive imidazole nitrogens include substitution as well as cross-linking. (U.S. Pat. Nos. 4,020,142 and 4,154,919). Blending PBI with aromatic polyamides, aromatic polyamide-hydrazides, and aromatic polyamides with heterocyclic linkages is also known. (U.S. Pat. No. 5,290,884). However, in all of such efforts, solubility of the PBI remains a problem and the typical product forms a paste or gel (referred to in industry as a "dope") in strong acidic conditions. Substitution of PBI includes modification with an omega halo alkanol or a 1,2-alkylene oxide to make hydroxyl substituted PBI. (U.S. Pat. No. 3,578,644). Other pathways are known to produce hydroxyl substituted PBI. (U.S. Pat. No. 4,599,388). Substituted PBI has also been formed by reacting substituted tetramino pyridines or their organic salts with a suitable acid halide or acid anhydride and cross-linking the result to yield PBI. (U.S. Pat. No. 3,943,125). N-aryl substituted PBI is also known. (U.S. Pat. No. 3,518,234). However, in each circumstance no increase of polymer solubility in common solvents was described.

In a series of patents, Sansone, et al. describes a variety of pathways for substitution of PBI. (U.S. Pat. No. 4,814,399, No. 4,997,892, No. 4,814,400, No. 4,868,249, No. 4,898,917, and No. 4,933,397). Even so, no indication is given that any of the resulting substituted PBI exhibited a solubility increase in common solvents compared to the original PBI. It is apparent from the deficiencies of the conventional products resulting from known PBI modification methods that it would be an advantage to provide a modified PBI exhibiting enhanced solvent solubility.

In addition, the methods described in the Sansone patents listed above used process conditions only obtainable with specialized equipment. For example, reaction temperatures greater than 50° C., reaction pressures greater than 2 atmospheres, and a PBI concentration in the starting polymer solution of greater than 5 weight percent (wt %). Such conditions were obtained with heated and pressurized reaction chambers and a relatively viscous polymer solution that all complicated production of a substituted PBI. The maximum degree of substitution was 83.3% and higher relative concentrations of reactants did not increase the degree of PBI substitution. U.S. Pat. No. 4,898,917 also stated that when the polymer solution contains less than about 5% concentration of PBI, the substitutions obtained are less than optimum.

As may be appreciated, a variety of areas exist wherein conventional PBI compounds and methods of making such compounds may be improved. According to one aspect of the invention, PBI compound includes imidazole nitrogens at least a portion of which are substituted with a moiety containing a carbonyl group. The substituted imidazole nitrogens are bonded to carbon of the carbonyl group. As one example, the compound may be a substituted poly-2,2'(m-phenylene)-5,5'-bibenzimidazole as well as other substituted PBI compounds. At least 85% of the imidazole nitrogens may be substituted with the carbonyl-containing moiety, though preferably, substantially all of the imidazole nitrogens are so substituted.

As will be understood by those of ordinary skill, conventional analysis may be used to determine the approximate degree of substitution. Since the molecular weight of PBI can be rather high, some small number of imidazole nitrogens might be cross-linked or otherwise not substituted by the organic-inorganic hybrid moiety. Yet, within the sensitivity of conventional analytic techniques, the PBI may give an indication that all of the imidazole nitrogens are so substituted. Understandably then, when "substantially all" of the imidazole nitrogens are so substituted a small number of nitrogens may be cross-linked or otherwise not substituted, but such a small number would be insignificant in light of the purposes described herein for improvement upon conventional PBI compounds.

Also, although a preference exists for substitution of the imidazole nitrogens with a single compound, such as the carbonyl-containing moiety, it is conceivable that multiple different compounds may be used. Carbonyl-containing compounds constitute one class of moieties possessing significant advantages previously unrecognized. Some carbonyl-containing moieties demonstrated to impart beneficial properties include RCO— where R is at least one of isobutoxy, ethoxy, and 4-bromobutyl (respectively, $(CH_3)_2CHCH_2OCO$—, $CH_3CH_2OCO$—, and $BrCH_2(CH_2)_3CO$—). Even so, other carbonyl-containing moieties may be advantageous as well. In general, the carbonyl-containing moiety may be RCO—, wherein R is alkoxy or haloalkyl. Bromoalkyl is a suitable moiety. The alkoxy or haloalkyl may bond to the imidazole nitrogens to form, respectively, a carbamate or an amide.

The R portion of the moiety might be evaluated and selected to provide similar, different, or additional advantages in comparison to the specific compounds listed above. Accordingly, more generally, R may be organic and optionally contain an inorganic component. As an example R may include alkyl, aryl, alkenyl, or alkynyl and the inorganic component may include oxygen, nitrogen, scandium, yttrium, titanium, zirconium, hafnium, vanadium, niobium, molybdenum, tungsten, iron, ruthenium, cobalt, rhodium, nickel, palladium, platinum, boron, aluminum, gallium, indium, silicon, germanium, tin, phosphorus, arsenic, antimony, sulfur, selenium, tellurium, or oxides thereof. R may be bonded to the carbon of the carbonyl group by other than a C—O bond. One example includes a C—C bond, such as when R consists of haloalkyl.

Many unsubstituted PBI compounds used in commercial applications are known for their stability and advantageous thermal properties, such as a high glass transition temperature ($T_g$). The $T_g$ of poly-2,2'(m-phenylene)-5,5'-bibenzimidazole is 435° C. Substitution of PBI can potentially modify thermal properties of the parent compound and diminish the advantageous thermal stability. A substituted PBI in keeping with the aspects of the invention may exhibit similar, or even improved, thermal stability in comparison to the unsubstituted PBI.

Figure 9:
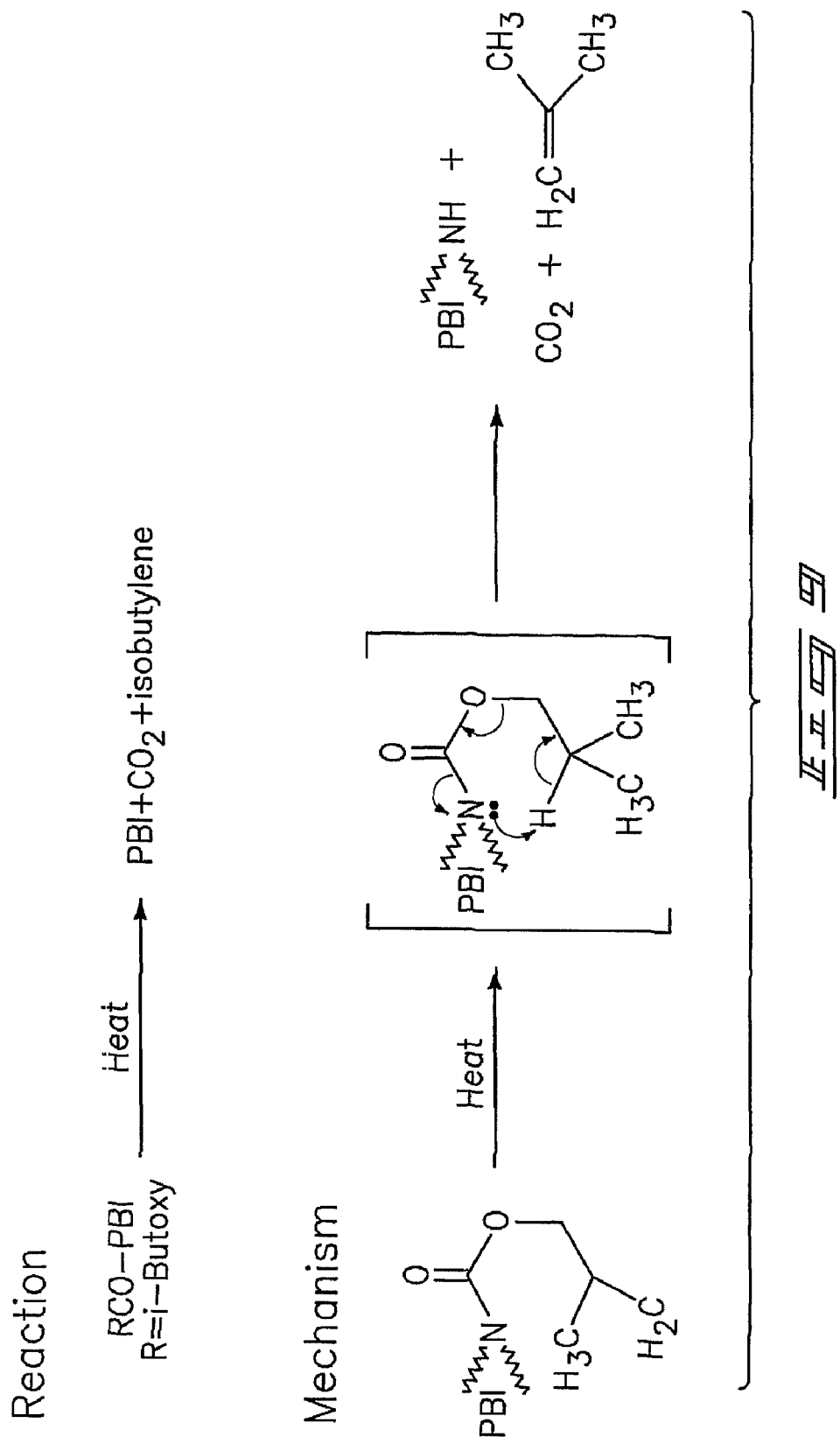
FIG. 9 shows a reaction sequence and mechanism that reverts substituted PBI back to the parent PBI.

Even though it may be desirable in many situations for the thermal properties of the PBI to remain largely unchanged after substitution, it may be desirable for the substitution to intentionally alter thermal properties. For example, as shown in FIG. 9, a substituted PBI may revert to the parent PBI upon heating. That is, a substituted PBI may exhibit a first temperature marking an onset of weight loss corresponding to reversion of the substituted PBI, the first temperature being less than a second temperature marking an onset of decomposition of an otherwise identical PBI compound without the substituted moiety. The first temperature may be at least 50° C. less than the second temperature.

Accordingly, substitution may yield a lower decomposition temperature in an initial heating cycle. The heating may occur at a temperature high enough to remove all of the substituted functional groups during the initial heating cycle as the substituted PBI reverts to the parent PBI. Subsequent heating cycles at a similar temperature may not affect the parent PBI. Thus, PBI may be substituted with functional groups that render it easier to manipulate in a particular application, such as film forming, and subsequently heat treated to revert to the original PBI. This thermoset type of behavior can enable improvement upon the inherent processing difficulties associated with PBI while still allowing the final product to contain the unsubstituted PBI.

Unsubstituted or substituted conventional PBI is known to exhibit poor solubilities in common solvents. Such property is demonstrated at least in U.S. Pat. No. 4,814,400 issued to Sansone and discussed above. It is apparent from Sansone that the poly-2,2'(m-phenylene)-5,5'-bibenzimidazole was difficult to use, prompting processing with a highly polar, aprotic organic solvent at elevated temperatures and pressures in a sealed vessel to completely dissolve PBI into solution. Even so, the polymer solution was quite viscous and filtering to remove undissolved PBI was recommended. Those of ordinary skill encounter similar difficulties when attempting to fabricate products that include PBI.

Accordingly, it is a significant advantage that the PBI compound according to the aspects of the invention exhibits solubility in an organic solvent greater than the solubility of the unsubstituted PBI. The PBI compound may exhibit a solubility in tetrahydrofuran (THF), chloroform, or dichloromethane of at least about 0.01 grams per milliliter of solvent (g/mL), or preferably at least about 0.2 g/mL. Such solubility may be exhibited within about 30 minutes or less at room temperature. Longer periods for full dissolution to occur and/or higher temperatures are less preferred.

In another aspect of the invention, a polymeric medium includes a PBI compound having imidazole nitrogens at least a portion of which are substituted with a moiety containing a carbonyl group. The substituted imidazole nitrogens are bonded to carbon of the carbonyl group. The PBI compound may have a similar composition and exhibit similar properties to those described above. As may be appreciated, tailoring thermal properties of the parent PBI and enhancing solvent solubility may be particularly advantageous in forming a polymeric medium. Possible applications for the polymeric medium that includes the substituted PBI include, without limitation, $^{13}$C NMR analysis, carbon-14 radioactive labeling, silica imprints, synthetic transformations, ink-jet printing, and lithography. The polymeric medium may be separatory, electronically conductive, and/or ionically conductive.

The term "separatory medium" encompasses a variety of materials, including but not limited to membranes (semi-permeable, permeable, and non-permeable), barriers, ion exchange media, filters, gas chromatography coatings (such as stationary phase coatings in affinity chromatography), etc. The separatory medium including such a substituted PBI compound may exhibit a $H_2$, Ar, $N_2$, $O_2$, $CH_3$, and/or $CO_2$ gas permeability greater than the gas permeability of a comparable polymeric medium instead comprising the unsubstituted PBI compound. The substituted PBI compound may be used and/or modified in the same manner that poly-2,2'(m-phenylene)-5,5'-bibenzimidazole or other known PBI compounds have been or may be used and/or modified by those of ordinary skill to function as separatory media. For example, U.S. Pat. Nos. 4,693,824 and 4,693,825, both issued Sep. 15, 1997, as well as other references, describe forming separatory media.

Electronically conductive media may be membranes and/or materials that are useful in fabrication of nanowires, organic conductors, organic electronic devices, and the like. The substituted PBI compound may be used and/or modified in the same manner that poly-2,2'(m-phenylene)-5,5'-bibenzimidazole or other known PBI compounds have been or may be used and/or modified by those of ordinary skill to function as electronically conductive media. For example, U.S. Pat. No. 4,759,986, issued Jul. 26, 1988, and U.S. Pat. No. 5,017,420, issued May 21, 1991, as well as other references, describe forming electronically conductive media.

Ionically conductive media may be membranes and/or materials that are useful in fabrication of semi-fuel cells, fuel cells, and the like, such as for proton exchange membranes and/or polymer electrolyte membranes. The substituted PBI compound is well-suited for the potentially corrosive environment of semi-fuel cells and fuel cells. The substituted PBI compound may be used and/or modified in the same manner that poly-2,2'(m-phenylene)-5,5'-bibenzimidazole or other known PBI compounds have been or may be used and/or modified by those of ordinary skill to function as ionically conductive media. For example, U.S. Pat. No. 5,599,639, issued Feb. 4, 1997, and U.S. Pat. No. 6,124,060, issued Sep. 26, 2000, as well as other references, describe forming ionically conductive media.

In addition to improved PBI compounds, the aspects of the invention also include improvements in methods for making substituted PBI compounds and products comprising such compounds.

According to a further aspect of the invention, a substituted PBI synthesis method includes providing PBI having imidazole nitrogens, reacting the PBI with a compound containing a carbonyl group, and substituting at least a portion of the imidazole nitrogens with a moiety from the compound. The substituted imidazole nitrogens are bonded to carbon of the carbonyl group. By way of example, the PBI may be provided in a less than 5 wt % solution of the PBI in a solvent. Suitable solvents include DMSO, DMAc, DMF, NMP, and others known to those of ordinary skill A 2.5 wt % solution of the PBI in a solvent has proven effective. The method may further include ionizing the imidazole nitrogens, for example, by deprotonating with an alkali hydride. Sodium hydride (NaH) and other alkali hydrides known to those of ordinary skill are suitable.

The carbonyl-containing compound may be RCOX, where R is alkoxy or haloalkyl and X is halogen, preferably Cl. More generally, R may be organic, optionally containing an inorganic component, and X may be a leaving group. R may include alkyl, aryl, alkenyl, or alkynyl and the inorganic component may include oxygen, nitrogen, scandium, yttrium, titanium, zirconium, hafnium, vanadium, niobium, molybdenum, tungsten, iron, ruthenium, cobalt, rhodium, nickel, palladium, platinum, boron, aluminum, gallium, indium, silicon, germanium, tin, phosphorus, arsenic, antimony, sulfur, selenium, tellurium, or oxides thereof. X may include halogen, cyano, thiocyano, oxycyano, thioalkyl, alkoxy, fluoroalkoxy, sulfonylalkyl, oxyaromatic, thioaromatic, sulfonylaromatic, aromatic and alkyl carbodiimides, N-hydroxysuccinimide, oxyphosphorus containing compounds, or oxysilane containing compounds.

One advantage of the method includes performing process steps at room temperature and/or pressure. The ionizing may occur at from about 20 to about 30° C. The reacting and substituting can occur at from about 20 to about 30° C. As another advantage, the ionizing, reacting, and/or substituting may occur at about atmospheric pressure. The reacting may use more than 5 equivalents of the carbonyl-containing compound in relation to the imidazole nitrogens to be substituted. Preferably, the reacting uses at least 10 equivalents, for example about 10-15 equivalents, of the carbonyl-containing compound.

The use of such a high number of carbonyl-containing compound equivalents contradicts the teachings of conventional processes as indicated at least in U.S. Pat. No. 4,814, 400. Such patent indicates that more than 5 equivalents fails to achieve significantly higher substitutions than obtained between 1 and 5 equivalents and the highest degree of substitution obtained in such patent was 83.3%. In accordance with the aspects of the present invention, substantially all of the imidazole nitrogens may be substituted with the carbonyl-containing moiety. Observations indicated that the higher number of equivalents had the surprising effect of rendering the substituted PBI solvent soluble while a substituted PBI produced using 5 or fewer equivalents only exhibited slight solvent solubility.

According to another aspect of the invention, a separatory media fabrication method includes providing PBI having imidazole nitrogens, reacting the PBI with a compound containing a carbonyl group, substituting at least a portion of the imidazole nitrogens with a moiety from the compound, and forming a separatory media that contains the substituted PBI. The substituted imidazole nitrogens are bonded to carbon of the carbonyl group. Providing, reacting, and substituting the PBI may be performed in accordance with the methods described above for substituted PBI synthesis. As an example, one advantage of separatory media formed by such method is that it may exhibit a $H_2$, Ar, $N_2$, $O_2$, $CH_4$, and/or $CO_2$ gas permeability greater than the gas permeability of a comparable separatory media that instead comprises the PBI.

Figure 8:
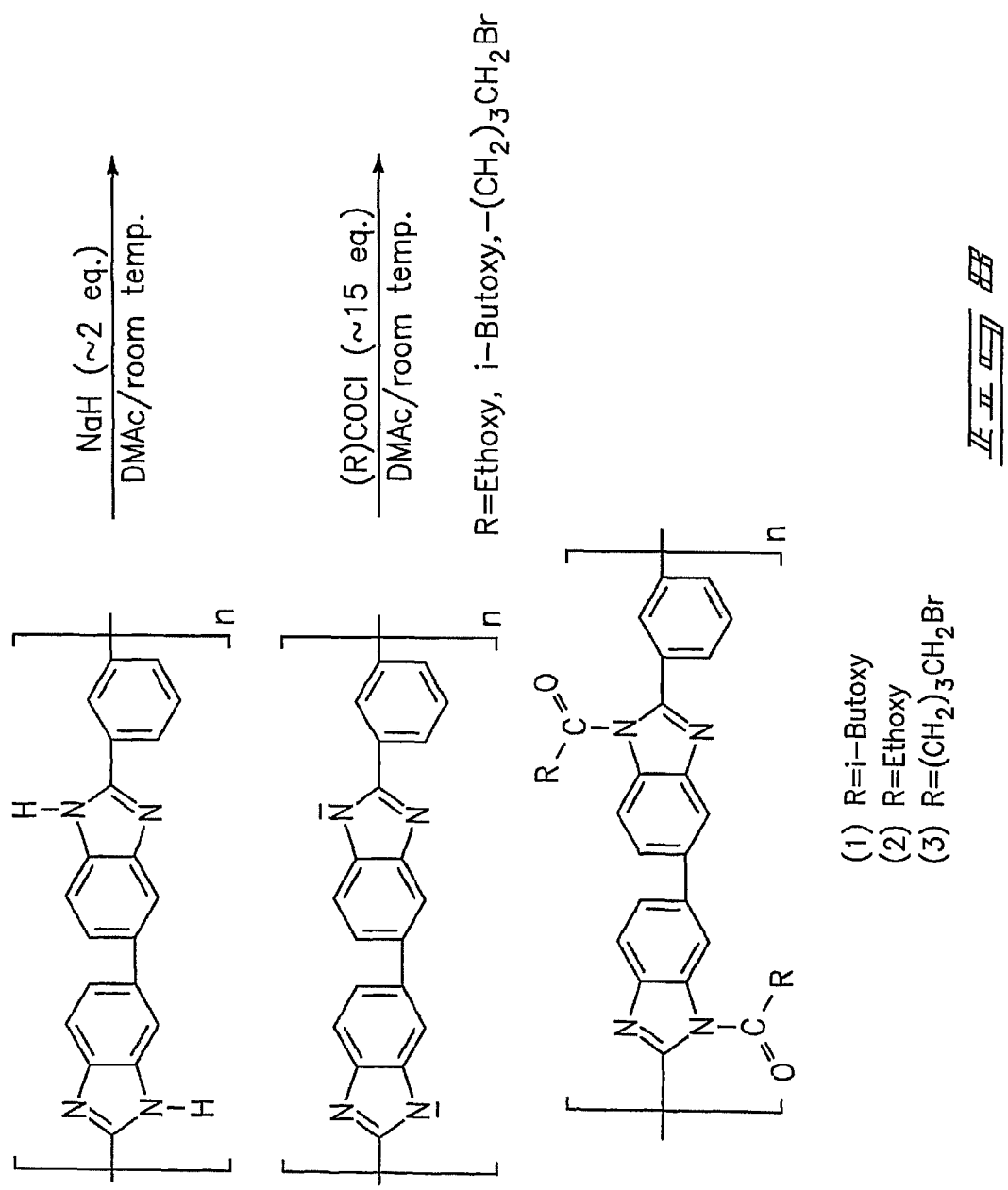
FIG. 8 shows a reaction sequence that forms polybenzimidazole (PBI) substituted with a carbonyl-containing moiety.

Suitable substituted PBI syntheses are described in Examples 1-3 below and summarized in FIG. 8.

EXAMPLE 1

A parent PBI solution was made by pulverizing 5 g of poly-2,2'(m-phenylene)-5,5'-bibenzimidazole (available commercially as Celazole™) to a fine powder and placing it into a 250 mL round bottom flask. The flask was equipped with a water-jacketed condenser, gas inlet adaptor, and magnetic stir bar. The system was placed under vacuum for 5 to 8 hours and the system was then purged with nitrogen. Anhydrous DMAc (200 mL) was transferred to the flask and the solution was heated to boiling with stirring for about 24 hours. The solution was allowed to cool to room temperature.

The cooled parent PBI solution (32 mL; 0.0013 mol of the polymer repeating unit, each having two reactive N—H sites) was filtered through a 0.45 µm PTFE filter by syringe and transferred into a 100 mL round bottom flask equipped with a gas inlet adapter and magnetic stir bar and charged with nitrogen. NaH (80% in oil dispersion) (180 mg; 0.0063 mol) was directly added to the PBI solution and stirred for about 6 hours at room temperature. During this time, a deep red/violet color and increased viscosity of the solution was observed. After most of the NaH was consumed, a substitution compound containing a carbonyl group (($CH_3)_2CHCH_2OCOCl$; 5 mL; 0.039 mol; 15 equivalents per N—H site) was added via syringe to the flask. The reaction mixture color changed to a light yellowish brown after the carbonyl compound addition. This solution was stirred for 48 hours at room temperature. The solution color returned to a yellowish-brown (similar to the parent PBI) during this time. Compound 1 shown in FIG. 2 was formed.

Upon completion, the reaction solution was transferred directly into a 2000 mL beaker filled with de-ionized, nanopure water (1200 mL). The polymer immediately precipitated in water as a yellow-brown solid. The water-polymer solution was mixed well and filtered through fluted filter paper. The collected polymer was transferred to a crystallizing dish to air-dry overnight. The next day, the dry polymer was dissolved in THF (50-150 mL). Sonication was used to disperse and affect dissolution of the polymer in the solution. This THF solution was filtered through fluted filter paper. Any collected solids were set aside, and the yellow-brown, polymer-containing THF solution was condensed to a minimal amount.

This solution was added drop wise to a 2000 mL beaker filled with hexanes (1000-1200 mL). The polymer precipitated as light-yellow feathery solid or light-yellow flakes. The hexanes solution was mixed well and the solids were allowed to settle. The hexanes polymer solution was decanted through a paper filter or filtered through a vacuum aspirator equipped with a 5.0 µm nylon filter. The polymer was collected from the filter paper and dried under vacuum to give a near quantitative yield. Yield of the substituted PBI was 95 wt % of the parent PBI as shown in Table 1.

Figure 3:
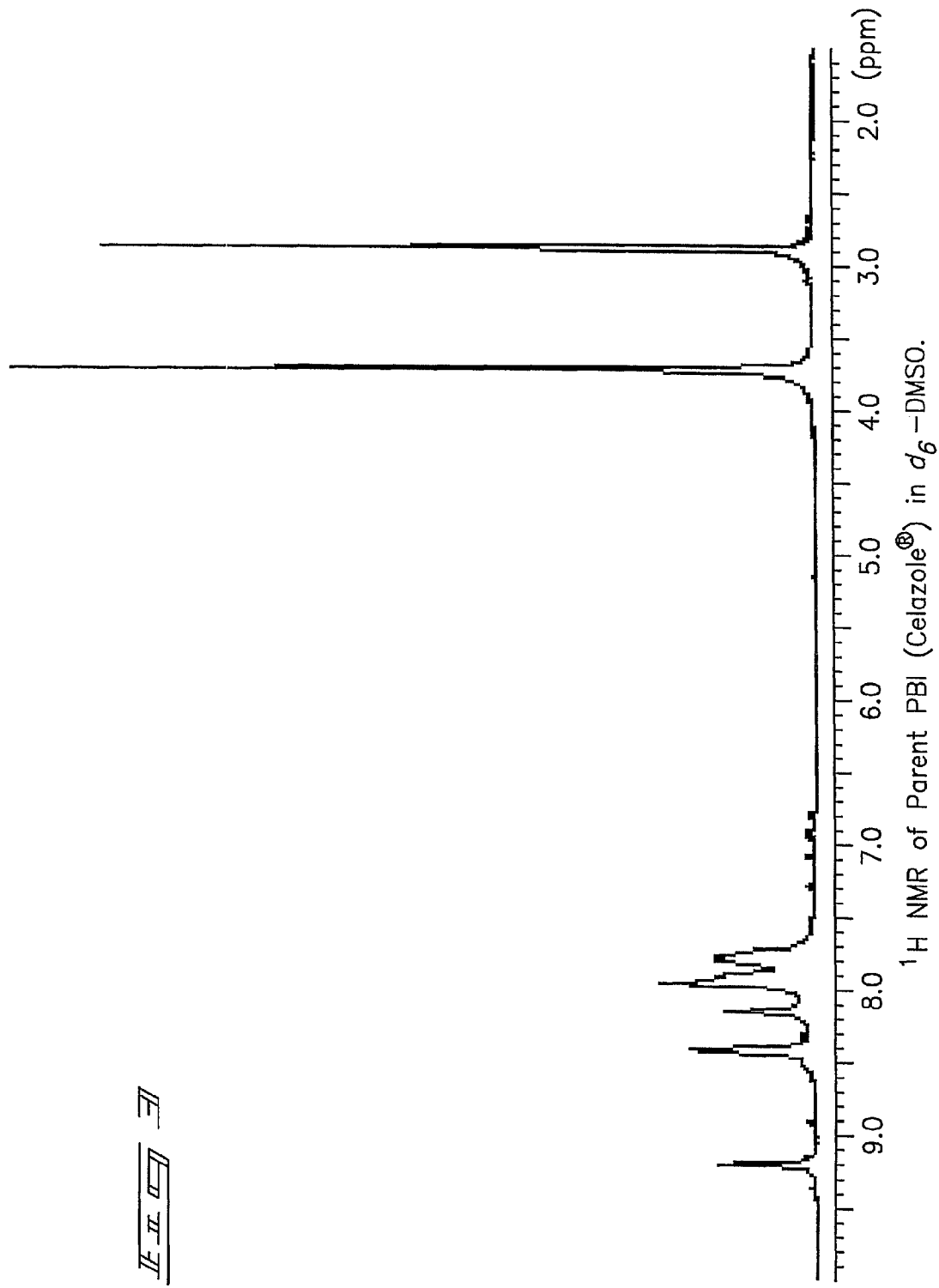
FIG. 3 shows the $^1H$ NMR analytical results for poly-2,2'(m-phenylene)-5,5'-bibenzimidazole.
Figure 4:
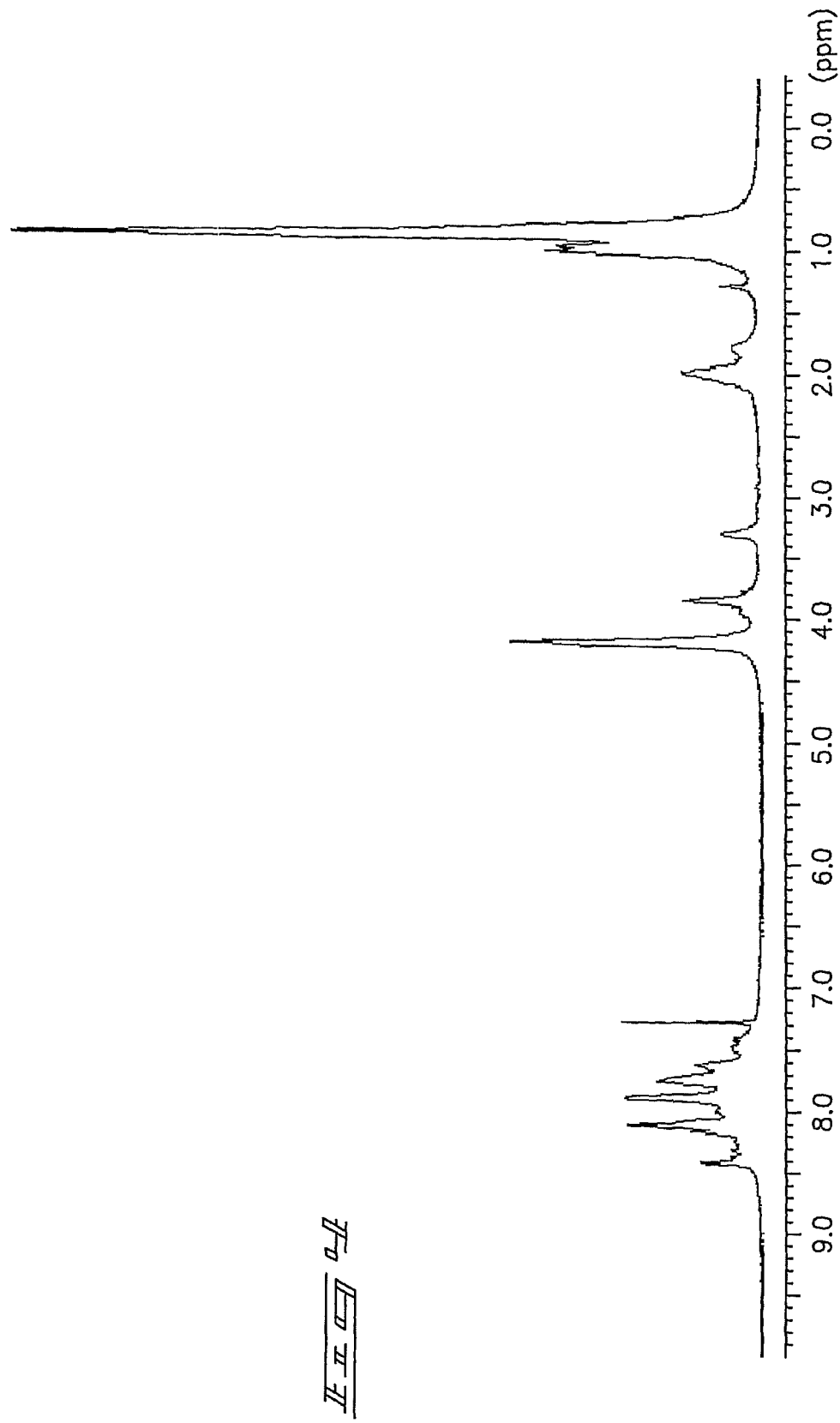
FIG. 4 shows the $^1$H NMR analytical results for $(CH_3)_2CHCH_2OCO$— substituted poly-2,2'(m-phenylene)-5,5'-bibenzimidazole.

NMR analysis was used to identify the modified PBI products in $CDCl_3$ as shown in FIG. 4 and may be compared to NMR analysis of the parent PBI in $d_6$-DMSO shown in FIG. 3. NMR spectra were recorded on a Bruker DMX 300WB spectrometer operating at 7.04 T: 300 MHz ($^1H$) and 75 MHz ($^{13}C\{^1H\}$, if performed).

A description of the parent PBI NMR spectra is as follows with designated H atoms such as $H_a$, $H_b$, etc. shown in FIG. 2: $^1H$ NMR δ ($d_6$-DMSO)=(s, $H_a$, 2H) 9.17, (broad multiplet, $H_b$, 2H) 8.30-8.38, (s, $H_c$, 2H) 8.06, (broad multiplet, $H_d$, 1H) 7.75-7.90, (broad multiplet, $H_e$, 1H) 7.60-7.75; $^{13}C\{^1H\}$ NMR δ ($d_6$-DMSO)=(s, aromatic) 153.1, (s, aromatic) 143.8, (s, aromatic) 142.5, (s, aromatic) 137.0, (s, aromatic) 135.8, (s, aromatic) 131.9, (s, aromatic) 131.0, (s, aromatic) 130.3, (s, aromatic) 129.6, (s, aromatic) 122.9, (s, aromatic) 120.1, (s, aromatic) 118.5, (s, aromatic) 111.1, (s, aromatic) 109.7.

A description of the substituted PBI (compound 1) NMR spectra is as follows: $^1H$ NMR δ ($CDCl_3$)=(broad multiplet, aromatic) 8.30-8.40, (broad multiplet, aromatic) 8.10-8.25, (broad multiplet, aromatic) 7.80-7.90, (broad multiplet, aromatic) 7.70-7.80, (broad multiplet, aromatic) 7.60-7.70, (broad multiplet, $CH_2$, 2H) 4.10-4.25, (broad multiplet, CH, 1H) 0.95-1.15, (broad multiplet, $(CH_3)_2$, 6H) 0.60-0.95.

EXAMPLE 2

Figure 2:
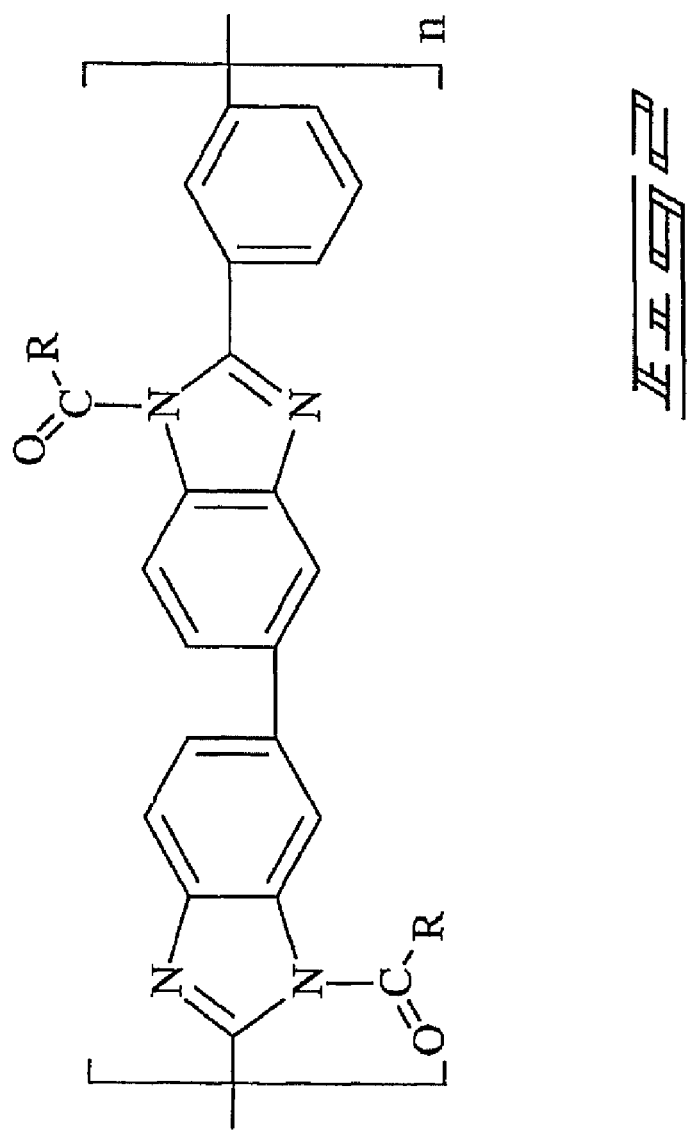
FIG. 2 shows the chemical structure of poly-2,2'(m-phenylene)-5,5'-bibenzimidazole substituted with an organic-inorganic hybrid moiety.
Figure 5:
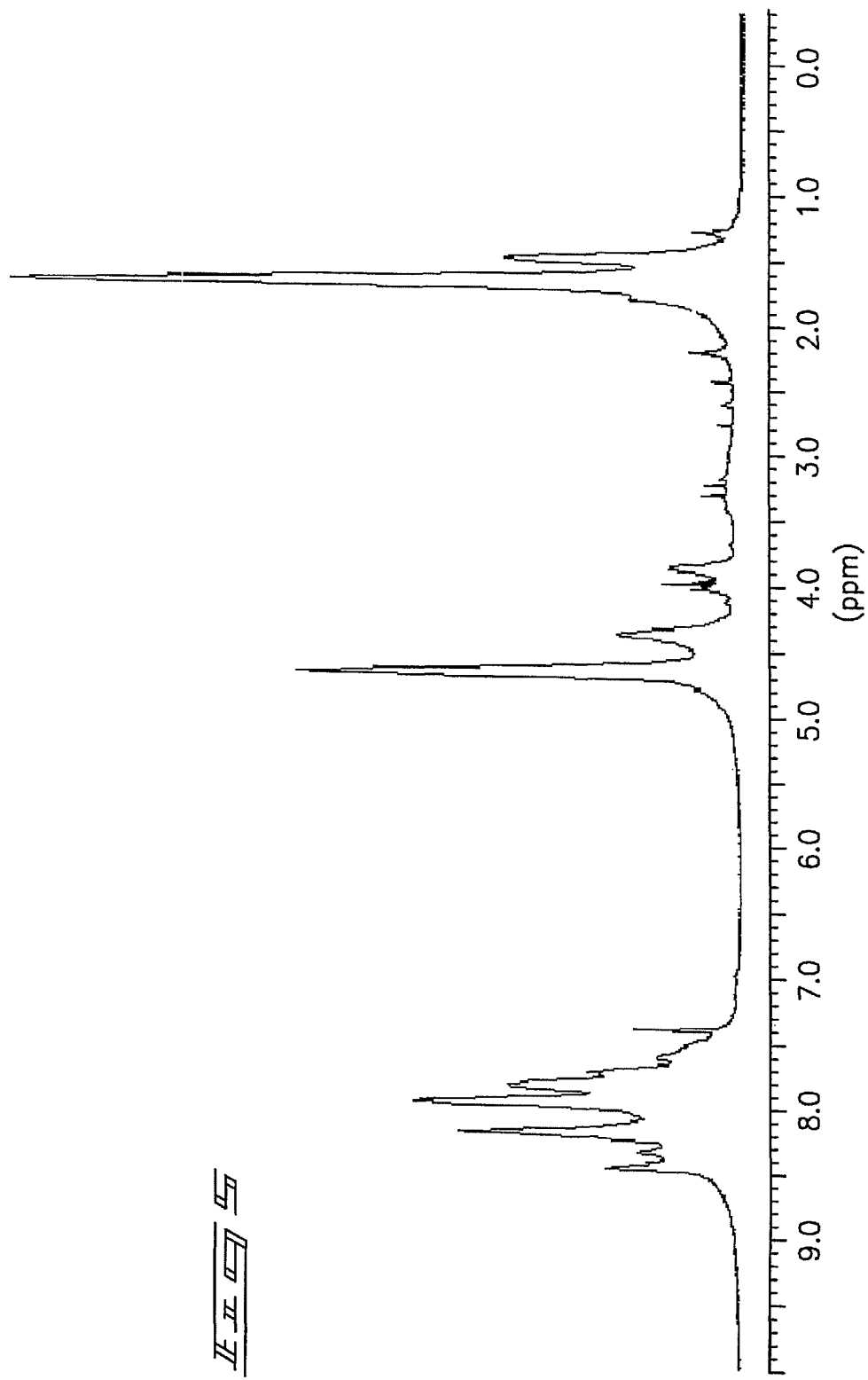
FIG. 5 shows the $^1$H NMR analytical results for $CH_3CH_2OCO$— substituted poly-2,2'(m-phenylene)-5,5'-bibenzimidazole.
Figure 7:
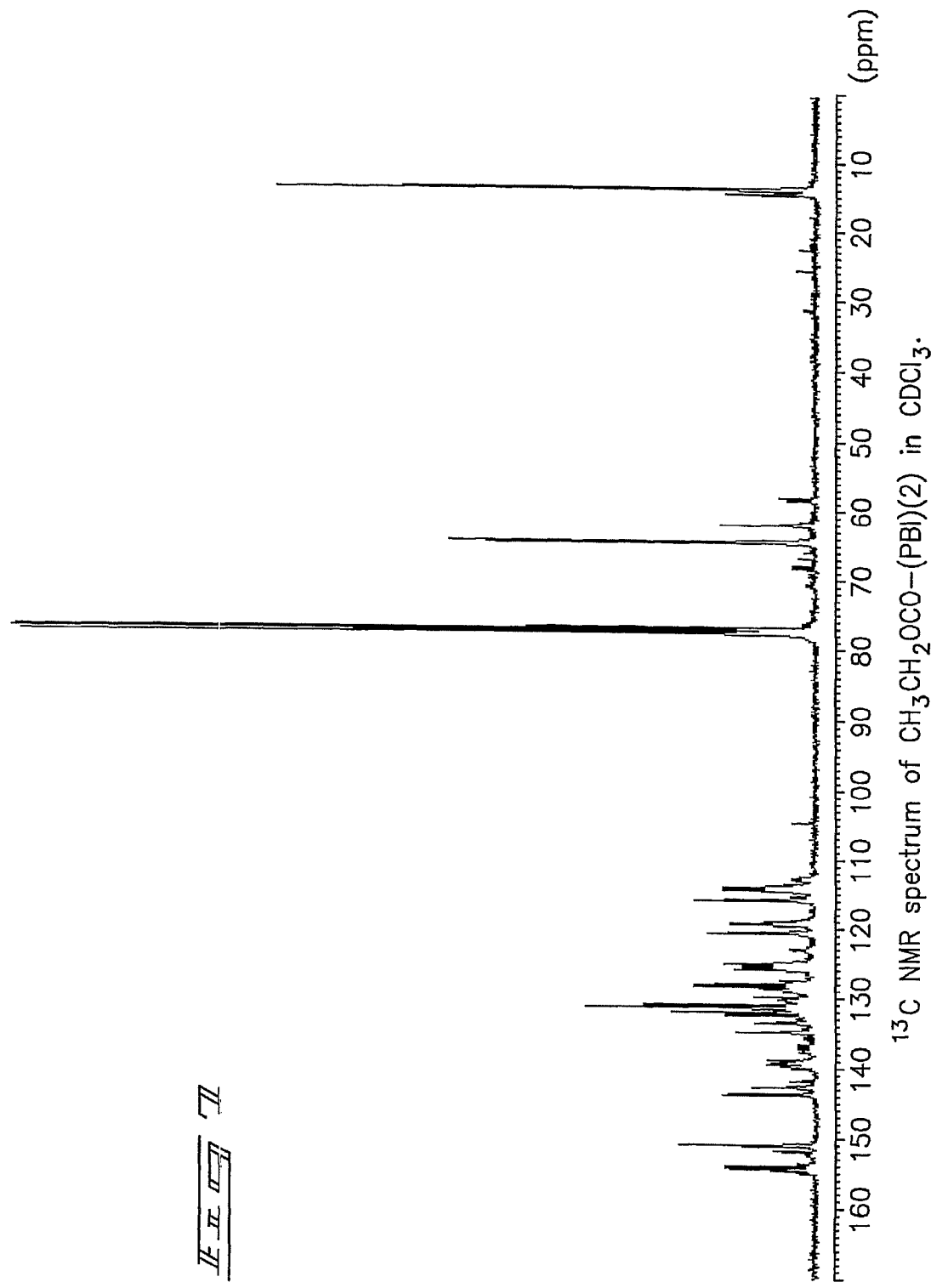
FIG. 7 shows the $^{13}C\{^1H\}$ NMR analytical results for $CH_3CH_2OCO$— substituted poly-2,2'(m-phenylene)-5,5'-bibenzimidazole.

Example 1 was repeated using $CH_3CH_2OCOCl$ (5 mL; 0.052 mol; 20 equivalents per N—H site) as the carbonyl-containing compound, forming compound 2 shown in FIG. 2. Yield of the substituted PBI was 95 wt % of the parent PBI as shown in Table 1. NMR analysis was used to identify the products in $CDCl_3$ as shown in FIGS. 5 and 7. A description of the substituted PBI (compound 2) NMR spectra is as follows: $^1H$ NMR δ $(CDCl_3)$=(broad multiplet, aromatic) 8.35-8.50, (broad multiplet, aromatic) 8.25-8.35, (broad multiplet, aromatic) 8.00-8.25, (broad multiplet, aromatic) 7.75-7.95, (broad multiplet, aromatic) 7.60-7.75, (broad multiplet, $CH_2$, 1H) 4.30-4.50, (broad multiplet, $CH_3$, 3H) 1.15-1.40; $^{13}C\{^1H\}$ NMR δ $(CDCl_3)$=(aromatic range, multiple peaks) 113.0-154.3, (s, $CH_2$) 64.9, (s, $CH_3$) 15.0.

EXAMPLE 3

Figure 6:
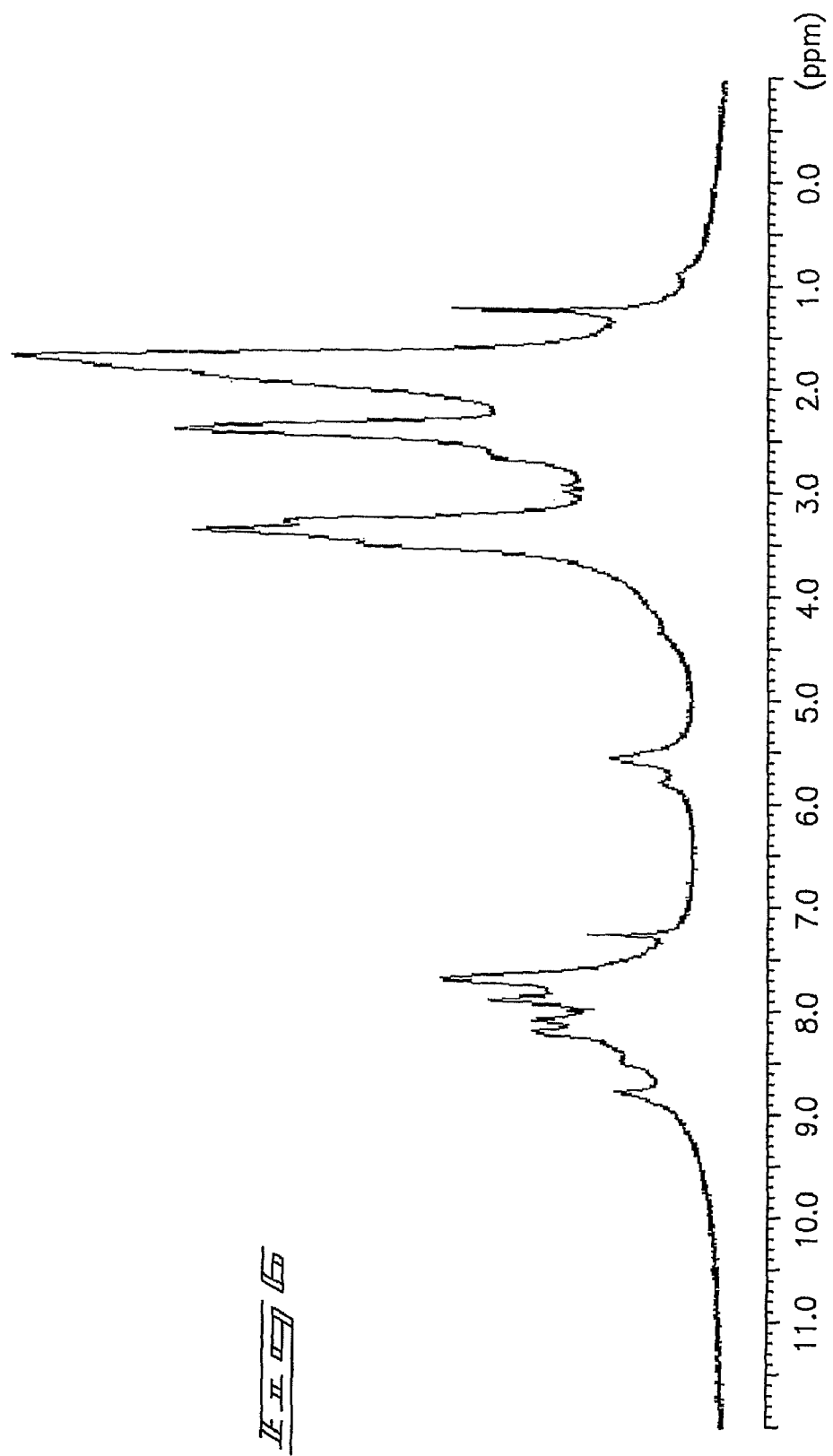
FIG. 6 shows the $^1$H NMR analytical results for $BrCH_2(CH_2)_3CO$— substituted poly-2,2'(m-phenylene)-5,5'-bibenzimidazole.

Example 1 was repeated using $(BrCH_2(CH_2)_3COCl$ (5 mL; 0.037 mol; 14 mole equivalents per N—H site) as the carbonyl-containing compound, forming compound 3 shown in FIG. 2. Yield of the substituted PBI was 20 wt % of the parent PBI as shown in Table 1. NMR analysis was used to identify the products in $CDCl_3$ as shown in FIG. 6. A description of the substituted PBI (compound 3) NMR spectra is as follows: $^1H$ NMR δ $(CDCl_3)$=(broad multiplet, aromatic) 8.75-9.00, (broad multiplet, aromatic) 8.15-8.25, (broad multiplet, aromatic) 8.00-8.15, (broad multiplet, aromatic) 7.80-8.00, (broad multiplet, aromatic) 7.50-7.70, (broad multiplet, $CH_2$, 2H) 3.25-3.75, (broad multiplet, $CH_2$, 2H) 2.20-2.60, (broad multiplet, $(CH_2)_2$, 6H) 1.50-2.10.

EXAMPLE 4

Molecular Weight Analysis

Dilute solution techniques are used to characterize the macromolecular structure of the polymers. 0.2 μm-filtered THF is used as the solvent and the analyses are performed at 25° C. Solution refractive index increment, do/dc values are obtained using a Rainin Dynamax RI-1 refractive index detector. High performance size exclusion chromatography (HPLC) is performed using a Waters Model 2690 solvent/sample delivery system with a column bank of two Styragel HR 5E (4.6 mm id.×300 mm) solvent efficient columns. The columns are kept isothermal and operated with a solvent flow rate of 0.3 mL/min. The polymer solutions are filtered through a 0.45 μm filter prior to injection onto the columns. Detection is achieved using a Wyatt Technologies DAWN-EOS laser light scattering detector with the K5 flow cell that measures scattered light intensities at angles ranging from 14.7° to 158.2°. The Dynamax RI-1 refractive index detector is placed in series with the light scattering detector as a concentration detector. Weight average molecular weight ($M_w$) and number average molecular weight ($M_n$) are determined and the polydispersity index (PDI) ($M_w/M_n$) calculated as an indication of the distribution of individual molecular weights in the batch of polymers. The molecular weight of the parent PBI is approximately 20,000 g/mol. Similar substituted PBI compounds previously synthesized exhibited molecular weights above 250,000 g/mol (see related U.S. patent application Ser. No. 10/862,921 filed Jun. 7, 2004 entitled "Polybenzimidazole Compounds, Polymeric Media, And Methods Of Post-Polymerization Modifications").

TABLE 1

| Polymer | Yield (percent) |
|---|---|
| Parent PBI | NA |
| $(CH_3)_2CHCH_2OCO$-(PBI) (1) | 95 |
| $CH_3CH_2OCO$-(PBI) (2) | 95 |
| $BrCH_2(CH_2)_3CO$-(PBI) (3) | 20 |

EXAMPLE 5

Thermal Analysis

Thermal analyses were obtained using TA Instruments Model 2910 differential scanning calorimeter (DSC) and a Model 2950 thermogravimetric analyzer (TGA). As indications of thermal stability, an attempt was made to determine $T_g$ and melt transition temperature ($T_m$). In a first heating cycle, a sample was heated to about 300° C. Compounds 1 and 2 showed sharp exothermic transitions in the DSC at respective temperatures of 270 and 221° C. (at a heating ramp rate of 10° C./min). In a second heating cycle, after cooling to room temperature and without removing the sample from the DSC chamber, the sample was heated to about 300° C. and the first cycle exotherm was not observed. However, slowing the heating ramp rate to 1° C./min dropped the compound 2 exotherm to 188° C. This drop often occurs with many compounds exhibiting an exotherm. It provides a way to slowly evolve off the gases.

As another indication of thermal stability, a determination was made of the temperature at which onset of decomposition occurred. Data are summarized in Table 2. The thermal gravimetric analysis of compounds 1 and 2 provides thermal properties expected for a carbamate. Their 22-23% weight loss is consistent with $CO_2$ and alkene evolution. The initial weight loss temperatures for compounds 1 and 2 are within 50° C. of each other. A slow heating cycle apparently removed all of the functional groups. The next weight loss for compounds 1 and 2 occurred at about 470-480° C., close to the parent PBI polymer initial weight loss temperature.

The exothermic behavior of compounds 1 and 2 was studied further by casting both as films. One set of films was subjected to a slow heating cycle (1° C./min) to 200° C. in a furnace exposed to the ambient atmosphere. Another set was used as a control. Both compounds 1 and 2 released the $CO_2$ and alkene without destroying the bulk film during the heating cycle. Both sets of films were analyzed by ESEM (Environmental Scanning Electron Microscopy) for consistency and the ESEM showed that the heat-treated film remained intact. Further examination of the films showed large voids prior to the heating cycle. However, the voids disappeared and the films showed significant compaction upon heating. This is consistent with $CO_2$ and alkene evolution, therefore it can be postulated that the carbamate PBI polymers reverted to the parent material.

TABLE 2

Differential Scanning Calorimetry and
Thermal Gravimetric Analysis Data.

| Polymer | $T_g$ and/or $T_m$ | Initial Weight Loss and Temperature in $N_2$ |
|---|---|---|
| Parent PBI | $T_g = 435°$ C.[a] | 512° C. |
| $(CH_3)_2CHCH_2OCO$-(PBI) (1) (first heating cycle) | $T_{exo} = 270°$ C.[b] | 23% wt. loss at 252° C.[b] 15% wt. loss at 480° C.[b] |
| $(CH_3)_2CHCH_2OCO$-(PBI) (1) (second heating cycle) | d[b] | e |
| $CH_3CH_2OCO$-(PBI) (2) (first heating cycle) | $T_{exo} = 221°$ C.[b] $T_{exo} = 188°$ C.[c] | 22% wt. loss at 216° C.[b] 12% wt. loss at 470° C.[b] |
| $CH_3CH_2OCO$-(PBI) (2) (second heating cycle) | d[b] | e |
| $BrCH_2(CH_2)_3CO$-(PBI) (3) | e | e |

[a] From manufacturer.
[b] Heating ramp rate = 10° C./min.
[c] Heating ramp rate = 1° C./min.
[d] No detectable thermal exotherms/endotherms up to 500° C.
[e] To be determined.

EXAMPLE 6

Gas Permeability

Figure 10:
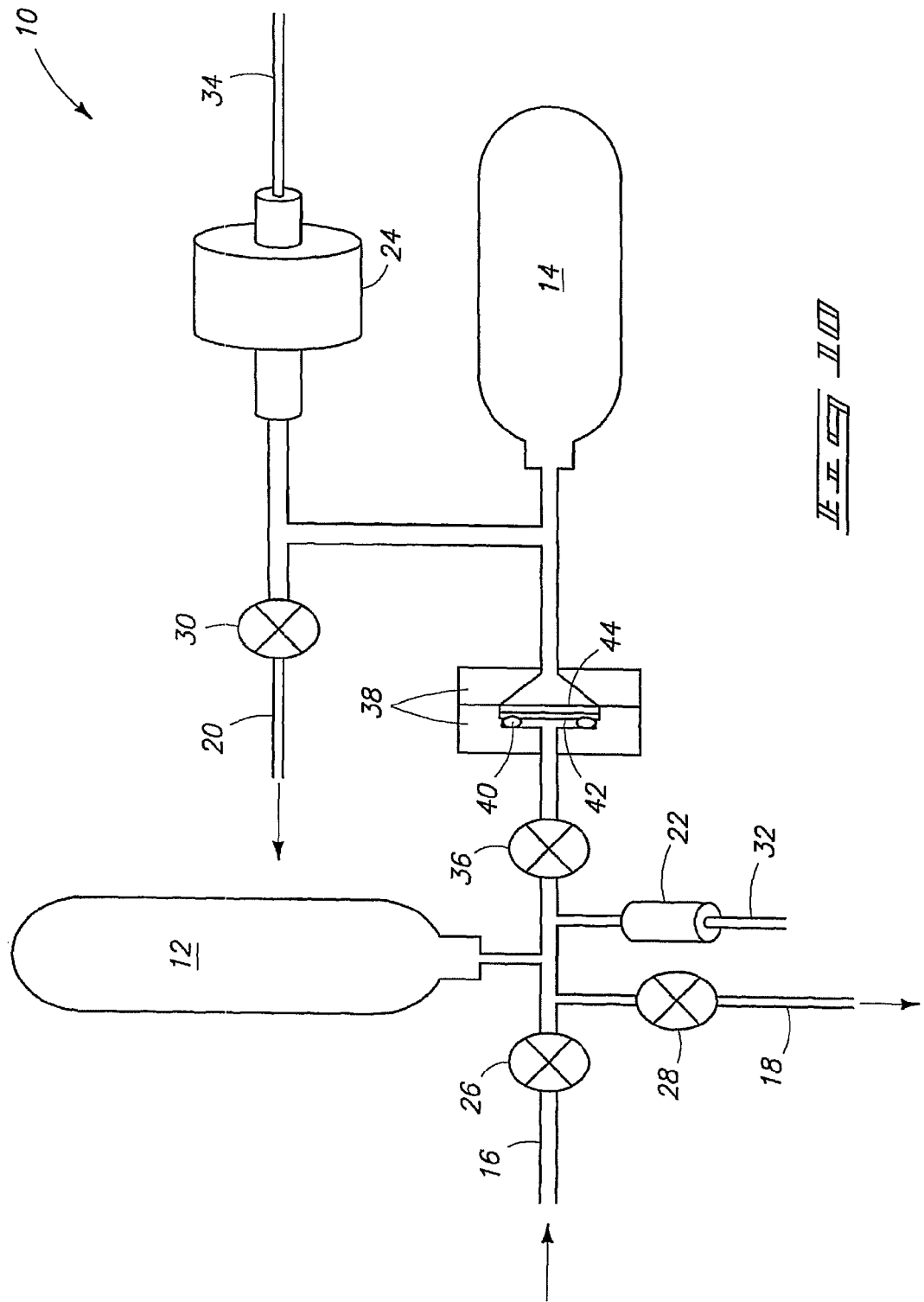
FIG. 10 shows the schematic representation of the time-lag pure gas permeability measurement method.

Gas permeability testing was performed using the time-lag method. Membranes were exposed to six different gases: He, $H_2$, $N_2$, $O_2$, $CH_4$ and $CO_2$. The interactions of the test gases and the polymer membranes were interpreted using the solution-diffusion model. FIG. 10 provides a schematic representation of the time-lag pure gas permeability measurement apparatus.

Turning to FIG. 10, a measurement apparatus 10 includes a membrane 42 formed on a porous support 44 and placed in a test cell 38 against O-ring 40 so as to seal a feed side of membrane 42 from the permeate side. Both sides of the membrane 42 (including the tubing, a feed reservoir 12, and a permeate reservoir 14) were evacuated to an equal vacuum using vacuum lines 18 and 20 with vacuum valves 28 and 30 open. Vacuum valves 28 and 30 along with an isolation valve 36 were closed, isolating test cell 38. Apparatus 10 was checked for leaks and the drift in pressure readings, if any, was characterized. A pressure baseline at zero time on the permeate side of membrane 42 was noted using a differential pressure transducer 24 providing a data signal through a data line 34. A feed valve 26 was opened and feed reservoir 12 filled through a feed line 16 to a desired initial feed pressure of the test gas as indicated by a pressure transducer 22 providing a data signal through a data line 32. Next, isolation valve 36 was opened, exposing the feed side of membrane 42 to the test gas. The pressure build-up on the permeate side of the membrane as a function of time was recorded. Previous to the testing, the volume of the permeate reservoir 14, the associated tubing, etc. on the permeate side of membrane 42 was well characterized to allow accurate calculations from the test data. The two values determined directly from the pure gas test system included time-lag and permeability.

Permeability is the rate at which the gas permeates through the membrane after the gas comes to equilibrium in the polymer. From initial introduction of the feed gas to the membrane, permeate pressure increases in a non-linear manner until the gas comes to equilibrium in the polymer. After reaching equilibrium, permeate pressure increases linearly with respect to time. Time-lag is the time that it takes the gas to permeate from the feed side of the membrane to the permeate side and is used to calculate the diffusivity. The basic relationship of the gas transport properties permeability (P), solubility (S), and diffusivity (D) in polymeric membranes is expressed in the following terms.

$$P = DS \qquad \text{Equation 1}$$

Permeabilities for these experiments were calculated using the following equations where test system volume is V ($cm^3$), test system feed gas initial pressure is $p_1$ (cm Hg), test system temperature is T (° C.), membrane thickness is l (cm), and membrane area exposed to the feed gas is A ($cm^2$). Slope was determined from a least squares fitted line of the time (sec) versus permeate gas pressure (cm Hg) steady state data set (data during equilibrium flux) obtained using the above method.

$$P = slope \frac{V}{76} \frac{273}{(273+T)} \frac{1}{A} \frac{l}{p_1} \qquad \text{Equation 2}$$

Time-lag is the intercept of the permeate gas initial pressure baseline and the least square fitted line for the data set. Given the slope and pressure axis intercept from the least square fitted line according to a y=ax+b formula wherein pressure=slope×time+intercept, time-lag may be calculated using $$t = timelag = \frac{baseline - intercept}{slope} \qquad \text{Equation 3}$$

and then the determined value for the time-lag used to calculate the diffusivity D.

$$D = \frac{l^2}{6t} \qquad \text{Equation 4}$$

Gas solubility is algebraically calculated from the measured quantities of permeability and diffusivity using Equation 1. Data are summarized in Table 3.

TABLE 3

Gas Testing Permeability.[a]

| Polymer | $H_2$ | Ar | $N_2$ | $O_2$ | $CH_4$ | $CO_2$ |
|---|---|---|---|---|---|---|
| Parent PBI @ 30° C. | 3.9 | 0.073 | 0.049 | 0.086 | 0.04 | 0.07 |
| Parent PBI @ 55° C. | 5.7 | 0.07 | 0.09 | 0.31 | 0.11 | 0.25 |
| $(CH_3)_2CHCH_2OCO$-(PBI) (1) (before heat treatment) | 27.7 | 1.0 | 0.5 | 1.9 | 1.8 | 18.7 |
| $(CH_3)_2CHCH_2OCO$-(PBI) (1) (after heat treatment) | c | c | c | c | c | c |
| $CH_3CH_2OCO$-(PBI) (2) (before heat treatment) | 89 | b | b | b | 35 | 47 |
| $CH_3CH_2OCO$-(PBI) (2) (after heat treatment) | c | c | c | c | c | c |
| $BrCH_2(CH_2)_3CO$-(PBI) (3) | c | c | c | c | c | c |

[a] Permeabilities in Barrers, $10^{-10} \cdot \left( \frac{cm^3_{gas-STP} \times cm}{cm^3 \times sec \times cm\ Hg} \right)$.
b Not analyzed.
c To be determined.

EXAMPLE 7

Solvent Solubility

Quantitative solvent solubility testing was performed in THF, chloroform, and dichloromethane. Qualitative observations of solubility were made for DMAc and NMP. Unless otherwise indicated, the solvent solubility data was obtained 30 minutes after addition to the solvent at room temperature or an otherwise indicated temperature.

TABLE 4

Solvent Solubility.

| Polymer | Solubility - grams/mL of Solvent | | | | |
|---|---|---|---|---|---|
| | THF | CHCl$_3$ | CH$_2$Cl$_2$ | DMAc | NMP |
| Parent PBI[a] | Not Soluble | Not Soluble | Not Soluble | Partially soluble | Partially soluble |
| (CH$_3$)$_2$CHCH$_2$OCO-(PBI) (1) | 0.3-0.25 | 0.3-0.25[b] | 0.3-0.25[b] | Soluble | Soluble |
| CH$_3$CH$_2$OCO-(PBI) (2) | 0.25-0.2 | 0.25-0.2[b] | 0.25-0.2[b] | Soluble | Soluble |

[a]Soluble in DMSO; partially soluble in DMF; 0.05-0.06 g/mL in formic acid. (Vogel, et al, *J. Polym. Sci.*, vol. 50, pg. 511, 1961).
[b]Elevated temperature (~50° C.) and constant stirring.
[c]Not tested.

A number of observations may be made from the above Examples. The yields for both the isobutyl chloroformate and ethyl chloroformate were approximately 95%, however, the reactions that used 5-bromovaleryl chloride resulted in lower yields, 20%. In addition, some of the bromide was eliminated from the alkyl chain to give a terminal alkene. This was probably due to the excess NaH in solution.

From the NMR analysis, the integration ratios of the $^1$H NMR spectra showed that roughly 100% of the PBI is substituted by the carbonyl-containing compounds. The unsubstituted imidazole (N—H) was not apparent in the $^1$H NMR spectrum at 9.2 ppm, and this was seen with all of the substituted polymers (FIGS. 2-6). The methylene (—CH$_2$OCO) for the carbamate modified PBI polymers (compounds 1 and 2) were easily determined from both $^1$H NMR (~4.20-4.40 ppm) and $^{13}$C{$^1$H} NMR (~65.0 ppm) spectra. The rest of the alkyl chain(s) for compound 1 (—CH$_3$ at 1.30 ppm) and compound 2 (—CH— at 1.00 ppm and —CH$_3$ at 0.88 ppm) were also seen in the $^1$H NMR. However, the methylene group next to the carbonyl (—CH$_2$CO) on compound 3 had a shift in the $^1$H NMR at about 2.50 ppm. The rest of the alkyl chain on compound 3 was also identified through $^1$H NMR. The functional group on compound 3 (—CH$_2$Br) can be clearly assigned for the $^1$H NMR spectra. In the aromatic region, four aromatic peaks were very similar in the $^1$H NMR spectra among compound 1-3 and parent PBI spectrum. All of the NMR data showed that compounds 1-3 are PBI modified materials.

The molecular weights expected for compounds 1-3, as discussed in Example 4, are likely an order of magnitude higher than the manufacturer's value for the parent PBI. This suggests that the parent PBI may have a higher molecular weight than indicated by the manufacturer or the PBI may cross-link, or exhibit continued living polymerization due to residual stable carbocations from the initial polymer synthesis, during the post-polymerization synthetic modification. A large polydispersity index (M$_w$/M$_n$) is also expected for the substituted PBI. This suggests that the parent PBI starting material does not have a narrow molecular weight range and that the manufacturer's value may exclude some of the larger molecular weights.

The gas testing of compounds 1-3 presents throughput values that are orders of magnitude better than the parent PBI (Table 3). However, not all of the gases are affected to the same extent. The H$_2$ and CO$_2$ values are the largest for compounds 1 and 2 while the other gas values are lower.

As may be appreciated from the description herein, the compounds, materials, and methods according to the aspects of the invention provide a number of advantages in comparison to known compounds, materials, and methods.

In compliance with the statute, the invention has been described in language more or less specific as to structural and methodical features. It is to be understood, however, that the invention is not limited to the specific features shown and described, since the means herein disclosed comprise preferred forms of putting the invention into effect. The invention is, therefore, claimed in any of its forms or modifications within the proper scope of the appended claims appropriately interpreted in accordance with the doctrine of equivalents.

We claim:

1. A polymeric medium comprising a PBI compound having imidazole nitrogens at least 85% of which are substituted with a moiety containing a carbonyl group, the substituted imidazole nitrogens being bonded to carbon of the carbonyl group.

2. The medium of claim 1 comprising a separatory medium.

3. The medium of claim 1 comprising an electronically conductive medium.

4. The medium of claim 1 comprising an ionically conductive medium.

5. The medium of claim 1 wherein substantially all of the imidazole nitrogens are substituted with the carbonyl-containing moiety.

6. The medium of claim 1 wherein the carbonyl-containing moiety comprises RCO—, where R is organic and optionally contains an inorganic component.

7. The medium of claim 6 wherein R consists of alkoxy or haloalkyl.

8. The medium of claim 1 wherein the carbonyl-containing moiety comprises at least one of (CH$_3$)$_2$CHCH$_2$OCO—, CH$_3$CH$_2$OCO—, and BrCH$_2$(CH$_2$)$_3$CO—.

9. The medium of claim 1 exhibiting a first temperature marking an onset of weight loss corresponding to reversion of the substituted PBI, the first temperature being less than a second temperature marking an onset of decomposition of an otherwise identical PBI compound without the substituted moiety.

10. The medium of claim 9 wherein the first temperature is at least 50° C. less than the second temperature.

11. A polymeric medium comprising a PBI compound having imidazole nitrogens at least a portion of which are substituted with a RCO— moiety, where R is organic and optionally contains an inorganic component, the substituted imidazole nitrogens being bonded to the carbon of the RCO— moiety carbonyl group and R being bonded to the carbon of the carbonyl group by other than a C—O bond.

12. The medium of claim 11 wherein R comprises alkyl, aryl, alkenyl, or alkynyl and the inorganic component comprises oxygen, nitrogen, scandium, yttrium, titanium, zirconium, hafnium, vanadium, niobium, molybdenum, tungsten, iron, ruthenium, cobalt, rhodium, nickel, palladium, platinum, boron, aluminum, gallium, indium, silicon, germanium, tin, phosphorus, arsenic, antimony, sulfur, selenium, tellurium, or oxides thereof.

13. The medium of claim 11 wherein R is bonded to the carbon of the carbonyl group by a C—C bond.

14. The medium of claim 13 wherein R consists of haloalkyl.

15. The medium of claim 11 comprising a separatory medium.

16. The medium of claim 11 exhibiting an $H_2$, Ar, $N_2$, $O_2$, $CH_3$, or $CO_2$ gas permeability greater than the gas permeability of a comparable separatory medium instead comprising the PBI compound without substitution.

17. The medium of claim 11 comprising an electronically conductive medium.

18. The medium of claim 11 comprising an conically conductive medium.

19. The medium of claim 11 comprising substituted poly-2,2'(m-phenylene)-5,5'-bibenzimidazole.

20. The medium of claim 11 wherein substantially all of the imidazole nitrogens are substituted with the RCO— moiety.

21. The medium of claim 11 wherein the RCO— moiety comprises $BrCH_2(CH_2)_3CO$—.

* * * * *